(12) United States Patent
Ardö et al.

(10) Patent No.: US 10,095,966 B2
(45) Date of Patent: Oct. 9, 2018

(54) METHOD AND SYSTEM FOR TRANSMISSION OF INFORMATION

(71) Applicant: Axis AB, Lund (SE)

(72) Inventors: Björn Ardö, Lund (SE); Igor Gurovski, Bunkeflostrand (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/585,941

(22) Filed: May 3, 2017

(65) Prior Publication Data

US 2017/0323187 A1   Nov. 9, 2017

(30) Foreign Application Priority Data

May 4, 2016   (KR) ................... 10-2016-0055252
May 12, 2016  (JP) ........................... 2016-096203
Nov. 18, 2016 (EP) .................................. 16199538

(51) Int. Cl.
  *G06K 7/12*    (2006.01)
  *G06K 19/06*   (2006.01)
  (Continued)

(52) U.S. Cl.
  CPC ....... *G06K 19/0614* (2013.01); *G06K 7/1095* (2013.01); *H04M 1/72522* (2013.01);
  (Continued)

(58) Field of Classification Search
  CPC ... G06K 7/1443; G06K 19/06037; G06K 7/14
  (Continued)

(56) References Cited

U.S. PATENT DOCUMENTS 7,543,748 B2   6/2009   Kiliccote
7,905,411 B2   3/2011   Ibe
(Continued)

FOREIGN PATENT DOCUMENTS

EP   1 655 947 A1   5/2006
EP   2 290 576 A1   3/2011
(Continued)

OTHER PUBLICATIONS

EP 15 16 8222.6 European Search Report (dated Dec. 4, 2015).
(Continued)

*Primary Examiner* — Ahshik Kim
(74) *Attorney, Agent, or Firm* — Volpe and Koenig, P.C.

(57) ABSTRACT

A method for visual transmission and reception of repeatedly changing information comprises repeatedly performing the following set of actions, receiving a first set of information to transmit, the first set of information is an update of a previously received set of information, generating an information carrying first pattern representing the first set of information; displaying the information carrying first pattern in a first color; receiving a second set of information to transmit, the second set of information is an update of the first set of information; generating an information carrying second pattern representing the second set of information; displaying the information carrying second pattern in a second color, the second color differs from the first color; and wherein one of the information carrying patterns is statically displayed when another one of the information carrying patterns is updated.

16 Claims, 10 Drawing Sheets

(51) Int. Cl.
*H04W 4/02* (2018.01)
*H04M 1/725* (2006.01)
*G06K 7/10* (2006.01)

(52) U.S. Cl.
CPC ...... *H04W 4/025* (2013.01); *G06K 19/06028* (2013.01); *G06K 19/06037* (2013.01)

(58) Field of Classification Search
USPC ............................... 235/462.09, 462.01, 469
See application file for complete search history.

(56) References Cited

U.S. PATENT DOCUMENTS

| | | | |
|---|---|---|---|
| 9,015,806 | B2 | 4/2015 | Song |
| 2008/0084473 | A1 | 4/2008 | Romanowich |
| 2009/0045259 | A1* | 2/2009 | Ehrhart ................ G06K 7/14 235/462.08 |
| 2009/0228694 | A1* | 9/2009 | Karstens ................ G06K 1/00 713/1 |
| 2010/0110212 | A1 | 5/2010 | Kuwahara et al. |
| 2010/0259549 | A1* | 10/2010 | Brown ................ G06F 21/36 345/589 |
| 2011/0085732 | A1 | 4/2011 | Cheng |
| 2012/0127319 | A1 | 5/2012 | Rao et al. |
| 2013/0157760 | A1* | 6/2013 | Boudville ............... G06K 7/12 463/31 |
| 2013/0240627 | A1 | 9/2013 | Mamaladze et al. |
| 2013/0271604 | A1 | 10/2013 | Follesa et al. |
| 2013/0343645 | A1* | 12/2013 | Dalal .................. G06K 7/1408 382/162 |
| 2014/0043209 | A1 | 2/2014 | Walker et al. |
| 2014/0211018 | A1 | 7/2014 | de Lima et al. |
| 2015/0198447 | A1 | 7/2015 | Chen et al. |
| 2016/0055848 | A1 | 2/2016 | Meruva et al. |

FOREIGN PATENT DOCUMENTS

| | | |
|---|---|---|
| GB | 2471567 A | 1/2011 |
| JP | 2014235676 A2 | 12/2014 |
| WO | 2010097618 A1 | 9/2010 |
| WO | 2015/017802 A1 | 2/2015 |

OTHER PUBLICATIONS

Hiroyuki Ukida et al.; "Visual Communication Using LED Panel and Video Camera for Mobile Object"; Imaging Systems and Techniques (IST), 2012 IEEE International Conference on, IEEE, Jul. 16, 2012; pp. 321-326; XP032237222.
Camera Pose Estimation Using QR codes in MATLAB; Stack Overflow question and answer website; Jonathan Brian (Nov. 27, 2013).
QR-GPS Plugin; Internet search (Feb. 18, 2014).
Zmodo 720P HD Wireless Indoor Network IP Camera Overview (2013).
Logitech; Setting up the Logitech Broadcaster Wi-Fi webcam using the QR Code with the iPad and IPhone; Troubleshooting; Customer Help answers (Nov. 6, 2013).

* cited by examiner

METHOD AND SYSTEM FOR TRANSMISSION OF INFORMATION

FIELD OF INVENTION

The present invention relates to a method and a system for visual transmission of repeatedly updated information.

BACKGROUND

Video cameras capturing motion video imagery are commonly used in monitoring systems, surveillance system, access control system, etc.

Many settings of such a camera are relying on parameters of the environment in which the camera is mounted. Mapping surveillance cameras and/or monitoring cameras onto a map showing a surveyed/monitored area is therefore very useful for many applications. For example the map may be used to locate specific cameras for repair or simply to locate where a particular incident being captured on video really occurred. Moreover, the camera on the map may be paired with video streams originating from the specific camera in order to facilitate selection of a video stream related to the area in the map. The position data of the camera may also be recorded in the video in order to enable identification of where the video was captured.

This type of mapping may of course be performed manually by having a person checking where all the cameras are positioned and enter them onto a paper map or a digital map. The geographic positioning within the digital map may be performed by simply selecting a position in a map showed on a display or by entering coordinates representing the position of the camera. These coordinates may be given in any geographic coordinate system as long as the position is uniquely identified. The geographic position may also or alternatively be inserted into the video stream, sometimes referred to as geo-tagging. Hence, some settings useful for a camera monitoring a scene are the geographic position of the camera, the direction in which the camera is directed, the tilt angle of the camera in relation to a horizontal plane, etc. Other settings useful for a camera having a loudspeaker, e.g. a door station, are sound quality parameters which in many cases depends on the environment in which the loudspeaker is mounted.

Many such settings may be made manually. For instance a person may calculate or get the geographic position of the camera in other ways, may use a compass to get the bearing of the direction in which the camera is capturing images, may use a level in order to approximate the tilting angle of the camera, and then insert these values into the camera. Another example is related to the settings of a loudspeaker where a person will be listening to the loudspeaker playing some sound and making adjustments to settings controlling the loudspeaker until the sound is subjectively good enough.

An alternative way of making settings like these is to provide a device including a display for displaying information helping the camera-based system to make correct settings, a GPS circuit, or any equivalent positioning circuit, for determining the geographic position of the device, an accelerometer for determining tilt or possible roll of the device in relation to the horizontal plane, a compass circuit for determining the direction of the device, a microphone for detecting sounds in the environment, e.g. audio signals sent out from the loudspeaker of the camera system, etc., and make the device display information relating to the settings for the camera. The information for helping the camera-based system make the correct settings may be displayed as a graphical code on the display and the graphical code may include any of the above mentioned information types which are retrievable by the device having the display. This type of system facilitates the process of making settings to the camera system. However, there is a problem with this visual communication of information when it comes to repeatedly updated data, e.g. compass reading, geographic position, tilt angle are all varying when the device with the display is handheld due to hand movement. Moreover when it comes to the sound the device should present information relating to the sound sent by the loudspeaker. This information may be dynamic and ever-changing.

The one problem with communication of repeatedly updated information like this is that there is a risk that the graphical code on the display representing the information to transfer is updated during a frame capturing at the camera. This may be a problem for applications relying on receiving time critical information via the display or for applications where one image frame including corrupt data may be of some kind of disadvantage, e.g., introducing latency in the information transfer by requiring the system interpret the information in the next image frame not being corrupt, problem of never or seldom achieving a non-corrupted transmission as the image registration in the camera and the update of the information transmission display happens to be synchronized or almost synchronized, resulting in the camera capturing images during the update of the information graphic on the display.

SUMMARY

One object of the present invention is to increase reliability in transmission of data using a visual communication method including displaying information on a display and capturing the displayed information using a camera.

The object is achieved by means of a method according to claim 1, by means of a method according to claim 8, and by means of a system according to claim 13. Further embodiments of the invention are presented in the dependent claims.

In particular, according to at least one embodiment, a method for visual transmission of repeatedly changing information comprises repeatedly performing the following set of actions: receiving a first set of information to transmit, wherein the first set of information is an update of a previously received set of information, generating an information carrying first pattern representing the first set of information, displaying the information carrying first pattern in a first color, receiving a second set of information to transmit, wherein the second set of information is an update of the first set of information, generating an information carrying second pattern representing the second set of information, displaying the information carrying second pattern in a second color, wherein the second color differs from the first color, and wherein one of the information carrying patterns is statically displayed when another one of the information carrying patterns is updated. The advantage of having one of the information carrying patterns statically displayed during a period when another information carrying pattern is updated is that there always will be valid information to decode and that no synchronization of image display and image capture is necessary. Moreover, the scheme of alternating the color of displayed information carrying patterns of updated information facilitates distinguishing two different information carrying patterns from each other.

The information carrying pattern may form a one dimensional graphical code, which could be a bar code, or the information carrying pattern may form a two dimensional graphical code, which could be a QR-code.

Further, the information carrying first and second patterns may be interweaved in the same display area which is advantageous in that each of the information carrying patterns may utilize a majority of the display real estate and thereby may the information density of the information carrying pattern be high.

Moreover, some embodiments further include in each repetition: receiving a third set of information to transmit, wherein the third set of information is an update of the first and/or second set of information, generating an information carrying third pattern representing the third set of information, and displaying the information carrying third pattern in a third color, wherein the third color differs from the first color and from the second color.

According to another aspect of the invention a method for capturing and decoding visually transmitted and repeatedly updated information comprises repeatedly performing the following set of actions: capturing, by means of a digital image sensor, an image of a display including at least two information carrying patterns of different color, extracting from the captured image the information carrying pattern of a first color, decoding information from the extracted information carrying pattern of the first color, extracting from the captured image the information carrying pattern of a second color, and decoding information from the extracted information carrying pattern of the second color. The advantage of reading the two information carrying patterns being of different color is that the reception stability is increased due to the fact that if the decoding of one of the information carrying patterns fails, e.g., as a result of update of that information carrying pattern, the other colored information carrying pattern may be decoded instead. Hence, it is possible to receive non-corrupt updated data even if the image frame is captured during an update of an information carrying pattern.

The decoding of the extracted pattern of the second color may be performed in response to the decoding of the extracted pattern of the first color returning corrupt data. Thereby only decoding an extra information carrying pattern if necessary. Further, the extracting from the captured image of the pattern of a second color may be performed in response to the decoding of the extracted pattern of the first color returning corrupt data.

In further embodiments the method also includes extracting from the captured image the pattern of a third color and decoding the extracted pattern of the third color. Moreover, embodiments may further include detecting that the information in one of the captured patterns is corrupt and in response to such detection selecting the information from the other pattern as valid information.

According to yet a further aspect of the invention a system includes an image capturing device and a display device, wherein the display device is arranged to display repeatedly updated information using the method of any one of the embodiments above and wherein the image capturing device is arranged to capture and decode the displayed and repeatedly updated information using the method of any one of the above embodiments. The advantages of such a system correspond to the advantages of the corresponding features presented above.

The display device may be a handheld mobile display device and the image capturing device may be a motion video camera, which makes the system easily implemented and highly portable, i.e. the handheld mobile device may easily be used in a plurality of systems and is easily transported between them. In some embodiments the repeatedly updated information includes position coordinates of the handheld mobile display.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 1:
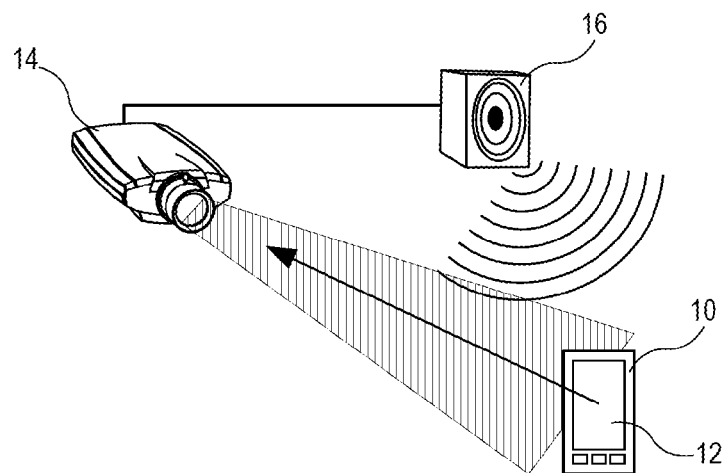
FIG. 1 is a schematic block diagram of a system according to some embodiments of the invention.

The present invention relates to visual transmission and reception of information that is repeatedly updated. A basic setup for a system implementing visual transmission includes a display device for displaying information to be transferred and some image or motion video capturing device for receiving or reading from the display device the information that is to be transferred. According to some embodiments, see FIG. 1, the display device 10 is an electronic device having a display 12, e.g. a mobile telephone, a personal digital assistant, a tablet, a wrist watch, a computer having a display, or any other electronic device having a reasonable large display. In some embodiments the motion video capturing device 14 is a digital video camera and in some embodiments the camera may be connected to a speaker 16. One problem in visual transmission using a display device 10 and a digital video camera 14 is that the digital video camera 14 is capturing an image of display 12 during a period when the display is updated with new information. In such a situation the captured video frame will include some new information and some old information, i.e. the information is not conclusive or even corrupt. If the information is displayed using a graphical code, i.e. a pattern representing the information, it is likely that the entire graphical code has to be captured in order to decode the information correctly. Therefore, if a video frame is captured during an update of the information on the display 12, the information cannot be correctly decoded on the digital video camera side.

This problem of the digital video camera 14 capturing a video frame including corrupt information due to update of the graphical representation on the display device 10 may occur if the digital video camera 14 is not synchronized so that the digital video camera 14 only captures fully updated graphical information presented on the display device 10. However, synchronizing of the devices and keeping them synchronized is not easily achieved. In particular, the problem is evident in applications in which the information to be transmitted is repeatedly updated whereby the risk of capturing an image frame including corrupt information is increased.

This problem of capturing non-fully updated graphical representation of information is addressed in embodiments of the invention including a display device that is arranged to enable capture of at least one graphical representation of updated information by making at least one graphical representation of repeatedly updated information present on the display at all time. Examples of applications are camera configuration, camera positioning, audio configuring, etc., and examples of data may be geographic position of a position detection device, a direction or bearing of a measuring device, degree of roll or pitch of a measuring device, sound level captured at a microphone, etc. A position detection device, a measuring device, and/or a microphone may be included in the display device 10.

Figure 2:
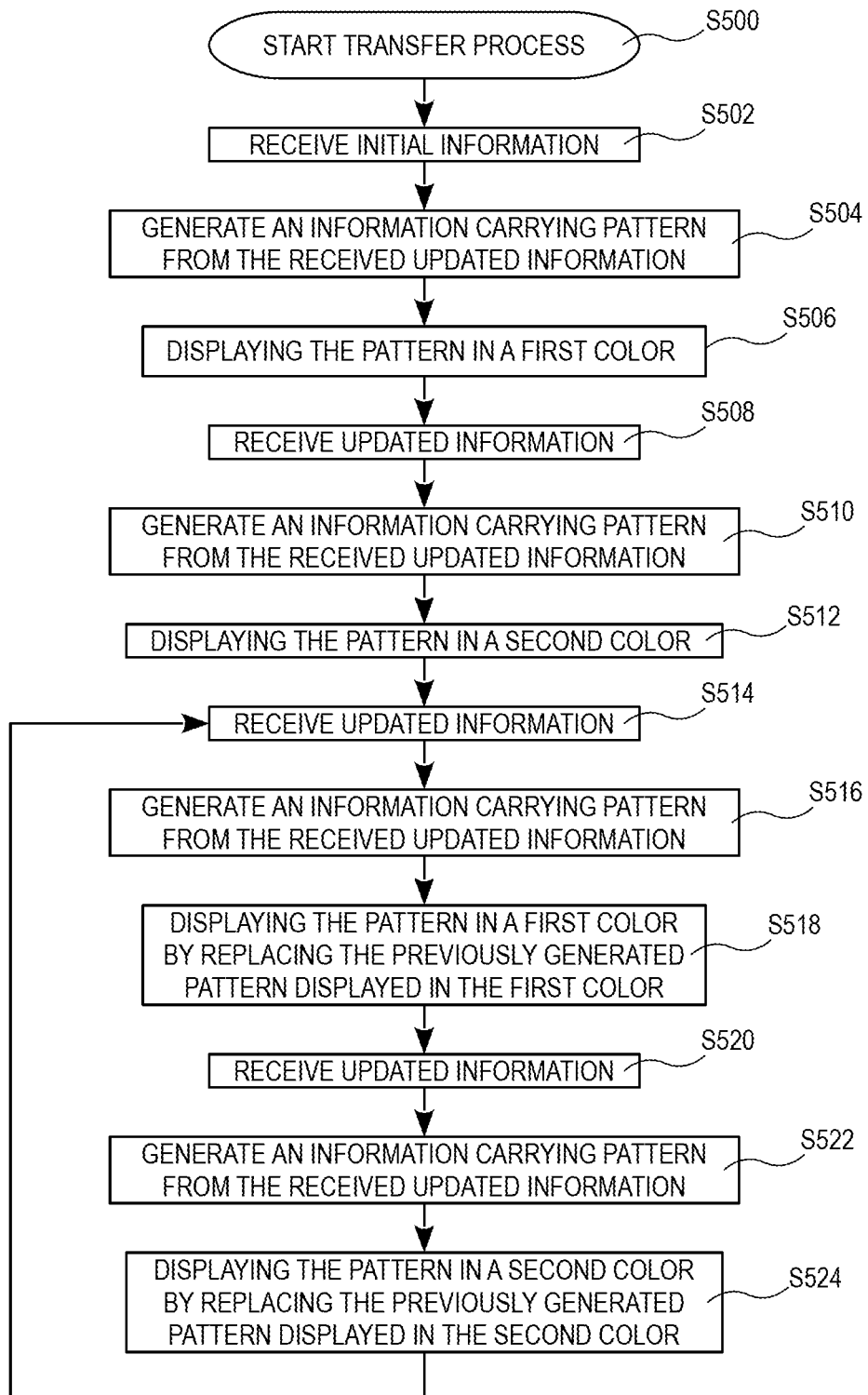
FIG. 2 is a flowchart of a process for displaying information for visual transmission according to embodiments of the invention.

The flowchart of FIG. 2 describes a process of embodiments achieving this purpose. This process may be performed in the display device 10. The transfer process, S500, includes the step of a first set of information being received, S502. Then, based on this information an information carrying pattern is generated for display of this information for visual transmission, S504. The generated pattern is then displayed in a first color on the display 12 of the display device 10, S506. The information may be repeatedly updated at a predetermined frequency which depends on required resolution of the application. This resolution may be necessary in order to provide data sensor information to the information receiving device in a live fashion and with enough sample points per time unit in order to achieve high-quality data, e.g., when representing audio or other time critical data. In some applications the latency is more important, e.g., when data presented in the graphical pattern is to be correlated with the rest of the image captured by the camera or in situations where the position in the captured image frame of the display is to be related to the position transferred as data via the graphical pattern. The latency may depend on the response time of the display and the time it takes for the camera to sample an image frame. The updated information may alternatively or complementarily be updated in response to movement of a positioning device providing information to the display device 10, variations in captured sounds, change in the direction of the display device 10 or a separate compass device, change in sensory inputs from an accelerometer, etc. The updated information is received, S508, and an information carrying pattern is generated based on this received updated information, S510. This information carrying pattern is then displayed on the display 12 in a second color. The information carrying pattern of the second color is displayed when the information carrying pattern of the first color is still presented on the display 12, hence, the information carrying pattern of the first color and of the second color are present on the display 12 simultaneously.

Then the process continues and further updated information is received, S514. A new information carrying pattern is generated from the received updated information, S516, and the presently displayed 12 information carrying pattern in the first color is replaced with this new information carrying pattern, which is also displayed in the first color, S518. Then yet another information update is received, S520, and a new information carrying pattern is generated from this information update, S522. This information carrying pattern is displayed in the second color and is replacing the previously displayed information carrying pattern of the second color, S524. Then the process returns to S514 to perform the steps S 514 to S 524 again and thereby repeatedly receive new updated information, generating information carrying patterns from the updated information, and displaying them alternately in the first and the second color respectively. This process is repeated over and over again until it is ended by a user, a timer, or another process interrupting the execution.

The information carrying pattern may be any graphical code that may be read and decoded using a camera 14. Examples of information carrying patterns are barcodes, QR codes, printed texts, etc. An advantage with two dimensional graphical codes, such as QR codes, in relation to one-dimensional graphical codes, such as barcodes, is that the two dimensional graphical codes enable higher information density, i.e. more data per surface unit, than the one dimensional graphical codes.

In the process described in connection with FIG. 2 it is described that a first information carrying pattern is displayed in a first color and a second information carrying pattern is displayed in a second color at the same time on the same display. During the update of one of the information carrying patterns the other information carrying pattern is statically displayed on the display device 10. Thereby the latest fully updated information is readable at all time.

Figure 4:
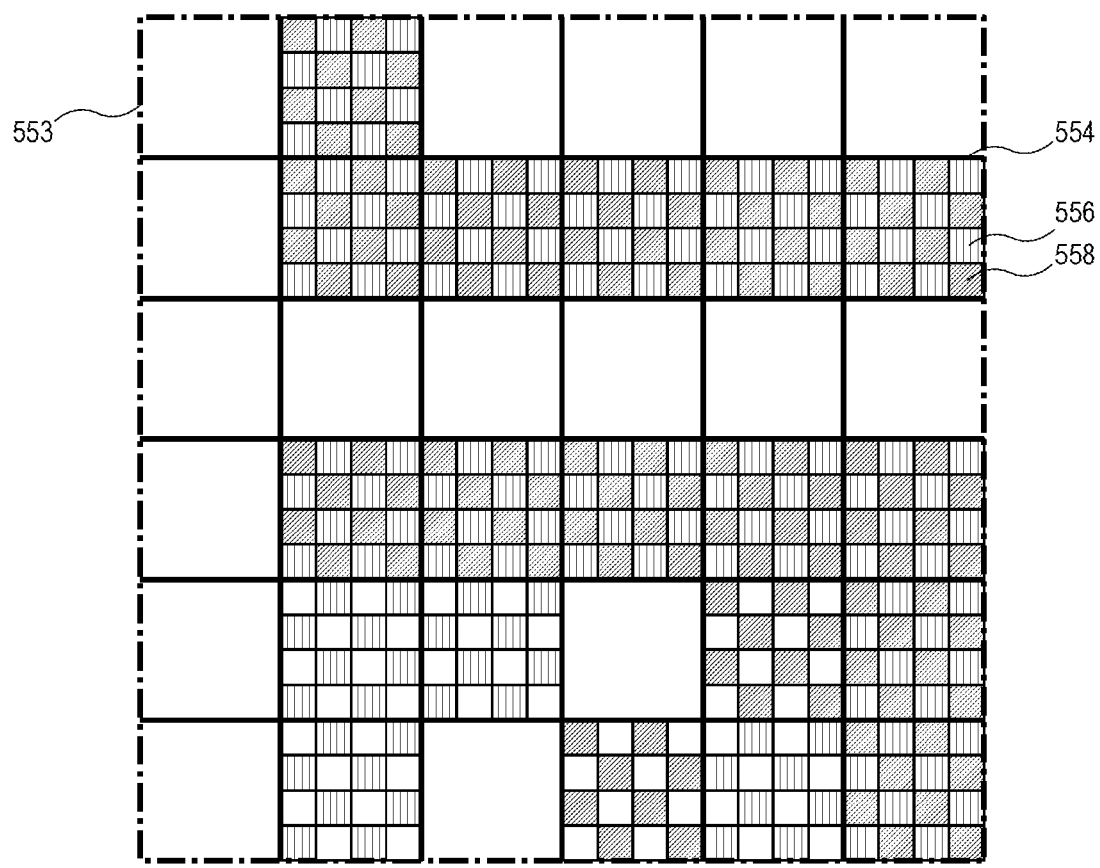
FIG. 4 is an example of a portion of an information carrying pattern including information from both the first and second set of information and which portion of the information carrying pattern is displayed according to some embodiments of the invention.
Figure 3A:
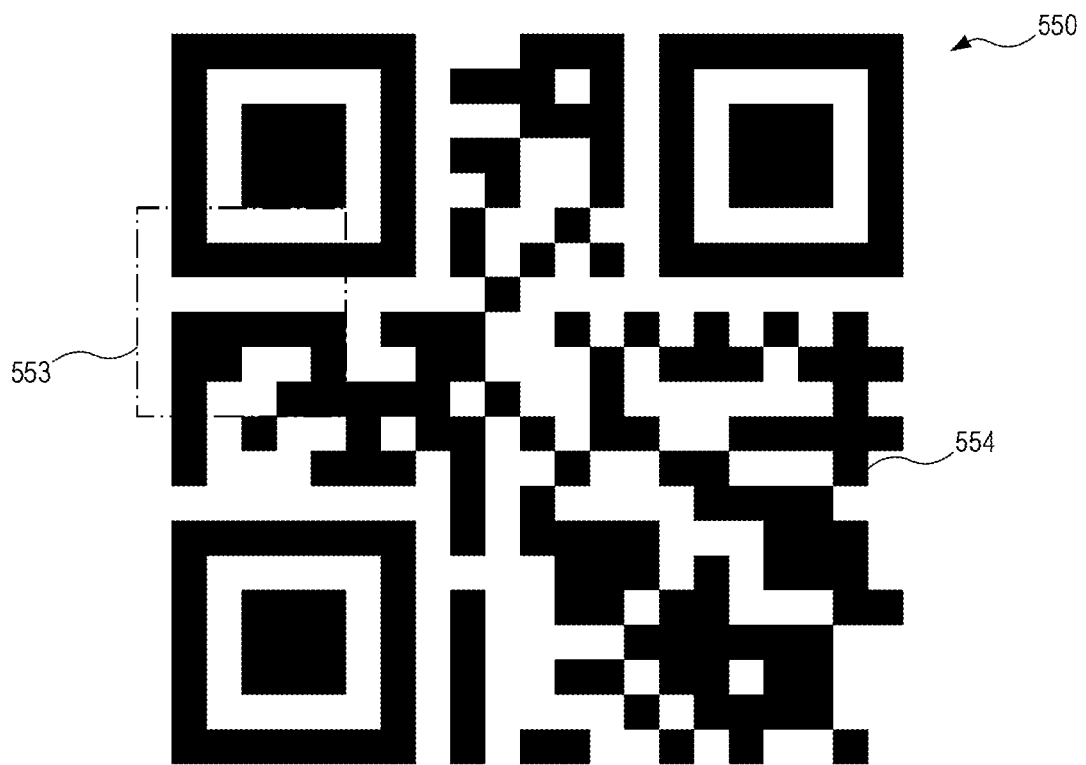
FIG. 3a is an example of a standard QR-code including a first set of information.
Figure 3B:
FIG. 3b is an example of a standard QR-code including a second set of information.

In FIGS. 3a and 3b, respectively, examples of a first information carrying pattern 550 and a second information carrying pattern 552 are depicted. According to embodiments of the invention the two information carrying patterns 550, 552 are combined or weaved together, each information carrying pattern 550, 552 having a distinct color, in order to enable displaying the two information carrying patterns simultaneously or at least displaying one of the information carrying patterns as a static pattern while the other pattern is updated. One way of weaving the two information carrying patterns 550, 552, is depicted in FIG. 4 which corresponds to the parts 553 of the information carrying patterns 550, 552, of FIGS. 3a and 3b that are indicated by dash-dot lines. The colors used to distinguish the two patterns from each other may be green and red, respectively. However, the skilled person realizes that other colors may be used.

The weaving of the two differently colored information carrying patterns as depicted in FIG. 4 allows each of the two patterns to be displayed over a majority of the display real estate and thereby enable higher resolution of the information carrying pattern than possible if the two patterns are positioned side by side. Hence, this arrangement allows for more information to be included in each transmission. The weaving of the two information carrying patterns 550, 552 is formed by letting each information carrying graphical element, e.g. an information position 554 in a QR-code which correspond to each of the squares that normally is being colored white or black depending on the status of this information position, be subdivided into smaller areas. In FIG. 4 each depicted information position is subdivided into 16 smaller areas represented as smaller squares within the square representing an information position 554. The different colors of the information carrying patterns 550, 552, are depicted by different hatches in FIG. 4. A sub area, such as sub area 556, having a vertical hatch pattern may represent the first color, e.g. green, and a sub area, such as sub area 558, having a slanted hatch pattern may represent the second color, e.g. red. An equal number of the subareas representing an information position 554 may represent the first color and the second color, respectively, and may be alternately arranged in the information position 554, as depicted in FIG. 4. Accordingly the combined information carrying patterns as depicted in FIG. 4 with each of the portions 553 from the separate information patterns depicted in FIGS. 3a and 3b results in an information position 554 being all-white when to the corresponding position in each of the information carrying patterns being white, an information position 554 including subareas of both colors resulting from the corresponding position in each of the information carrying patterns being black, an information position 554 including subareas of the first color and white subareas indicating that the corresponding position in the first color information pattern of FIG. 3a being black and the corresponding position in the second color information pattern of FIG. 3b being white, and an information position 554 including subareas of the second color and white subareas indicates that the corresponding position in the second color information pattern of FIG. 3b being black and the corresponding position in the second color information pattern of FIG. 3b being white.

Figure 5:
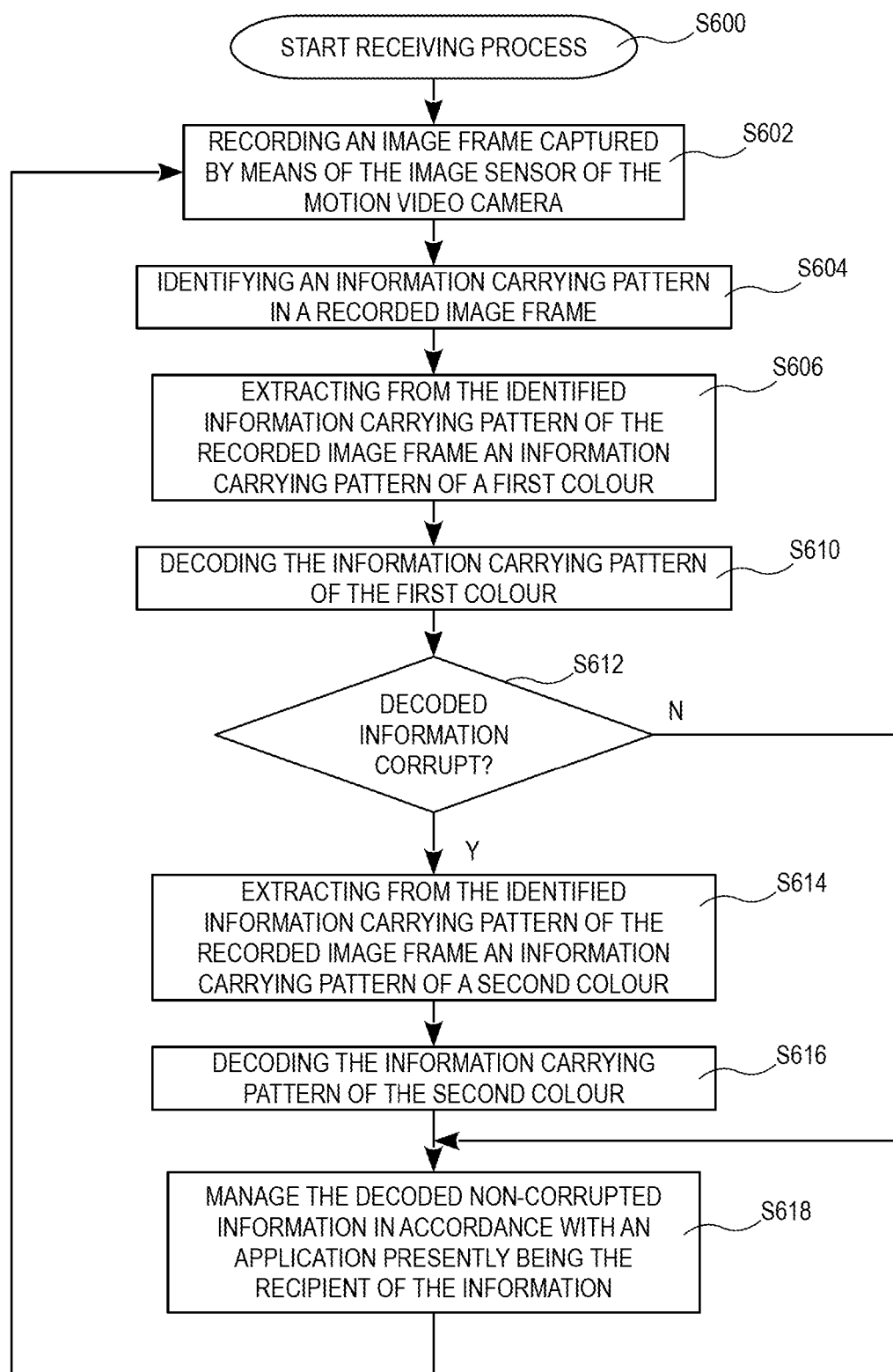
FIG. 5 is a flowchart of a process for receiving information from a visual transmission as described in connection with FIG. 2.

Now referring to FIG. 5, showing a flowchart over an information receiving process, S600, according to embodiments of the present invention. This process is performed in the motion video camera or in a system comprising a processing unit and a motion video camera. The motion video camera is recording motion video frames captured by the image sensor of the motion video camera, S602. A recorded image frame is analyzed for identification of an information carrying pattern, S604. The identification of the information carrying pattern is performed in a way known to the skilled person and may vary depending on the type of graphical code used. In the identified information carrying pattern information positions having the first color are identified and extracted to form the first information carrying pattern, S606. This information carrying pattern of the first color is then decoded, S610, and if the decoded information is not corrupt, S612, the process continues by managing the decoded non-corrupted information in accordance with an application that is presently being the recipient of the transferred information, S618. An application being a computer program running in the system. As mentioned above such an application may for instance be a camera positioning application, a camera settings application, an audio configuring application, etc. Then, when the information transmitted has been passed on to the appropriate recipient the process returns to the step S602 for recording a new image for decoding.

However, if the information decoded in step S610 is determined to be corrupt, S612, then the information positions of the information carrying pattern having the second color are identified and extracted to form the second information carrying pattern, S614. This information carrying pattern of the second color is then decoded, S616, and this decoded non-corrupted information is managed in accordance with the application presently being the recipient of the transferred information, S618, and the process returns to S602.

Embodiments of the invention may be used in systems for determining a position of a stationary surveillance and/or monitoring camera which will be described in more detail below. The description below also gives examples of what to include in the information carrying patterns discussed above and additional uses of the information carrying patterns themselves. The camera is stationary in the sense that it is not mobile, i.e. it is not moving from one location to another on a regular basis. The camera may, however, very well be a PTZ camera, i.e. a camera that is enabled to pan and tilt.

Figure 6:
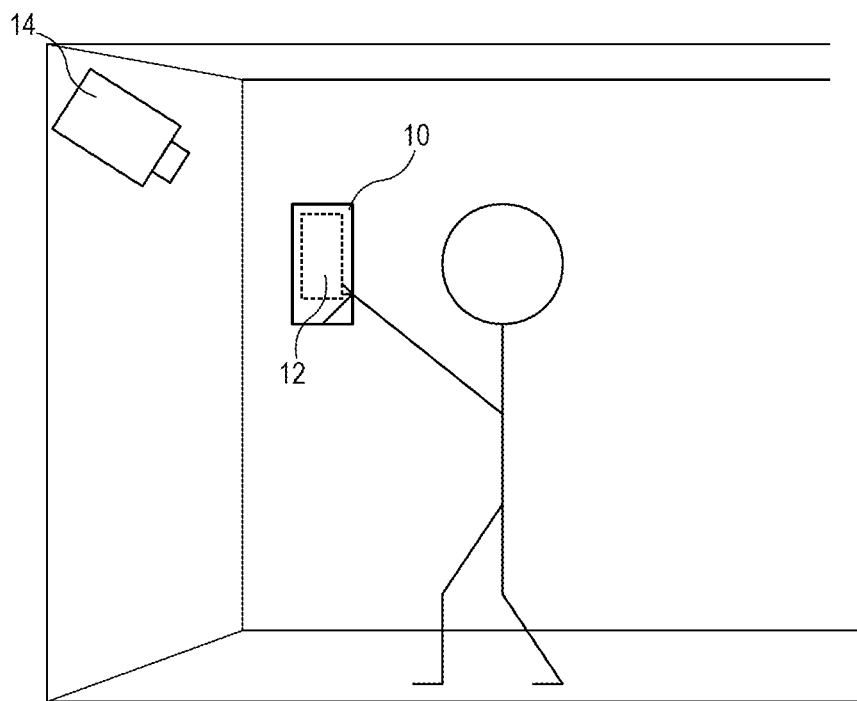
FIG. 6 is a schematic image of the system for determining spatial characteristics of a camera in use according to one embodiment of the invention.

According to one embodiment, see FIG. 6, a mobile device 10 having a display 12 is operated to generate a QR-code including at least information indicating the geographic position of the mobile device 10. Other graphical codes than QR-codes may of course be used, e.g., any two dimensional graphic code, any one dimensional graphic code, plain text, etc., but in order to facilitate the understanding of the invention the QR-code will be used in the examples throughout the rest of the description. Alternatively may temporal encoding, e.g., information being transferred using variation in luminance in one or a plurality of positions on a display, be used. However, a temporal encoding may not exhibit all advantages related to some of the two dimensional graphical codes. A mobile device may be a mobile telephone, a portable GPS, a tablet computer, or any other device having a display and the necessary functional components, which differ between embodiments and will all be described below. The QR-code is displayed on the display 12 of the mobile device 10 and the display of the mobile device 10 is showed to a monitoring camera 14 in the monitoring system, i.e. the display of the mobile device is temporarily arranged facing the optical input, e.g., lens, of the monitoring camera in order for the camera to capture and detect the image of the QR-code presented on the display of the mobile device. Then the QR-code is decoded and the monitoring camera is tagged with the position information given in the code, i.e. the geographical position information is stored in the camera and identified as the position of the camera or stored at a central server where it is stored as the position of this particular camera.

Figure 7:
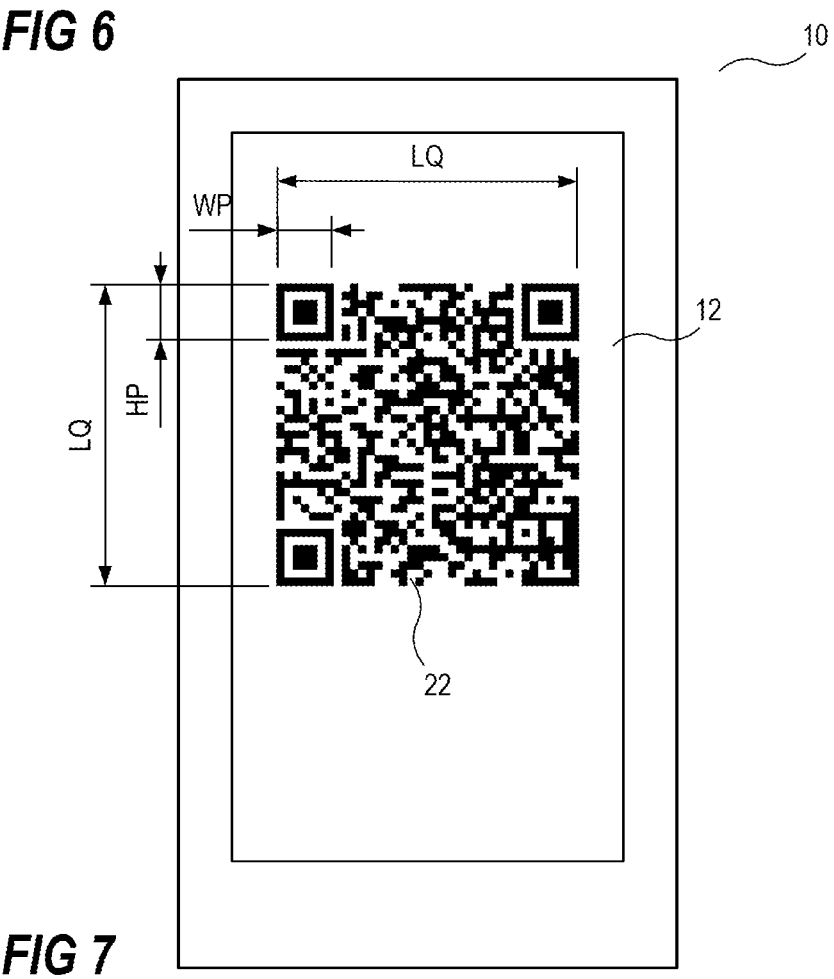
FIG. 7 is an example of a mobile device displaying a QR-code and highlighting some features of the QR-code which may be used in an embodiment of the invention.

In FIG. 7 an example of a QR-code 22 presented on the display 12 of the mobile device 10 is showed, the QR-code 22 in the figure is not carrying the information according to the invention but is rather an example included for explaining some additional parameters that the QR-code 22 may relay to the monitoring camera 14 and/or the monitoring system. In one embodiment the QR-code 22 may in addition to the position include display specific spatial information of the QR-code 22. This display specific spatial information may relate to a real size or a real distance of the QR-code 22 as presented on the display 12. For example, the display specific spatial information may represent the distance LQ between two corners of the QR-code 22, it may represent the width WP or height HP of a position indicator P in the QR-code 22. This display specific spatial information may be used by the monitoring camera 14 or the system to calculate a distance between the monitoring camera 14 and the mobile device 10. This calculated distance may then be utilized in order to adjust the geographic position of the mobile device 10, which is received in the monitoring camera, to more closely correspond to the real geographic position of the monitoring camera 14. Display specific spatial information may be used for even more adjustments and calculations which will be discussed below.

Further, the QR-code 22 may include information relating to the horizontal direction the mobile device 10 is facing. The direction may be given in degrees in relation to north, as used in a compass, and this horizontal direction may be generated by an electronic compass included in the mobile device 10. The horizontal direction may be seen as the pan angle or direction of the monitoring camera 14. In addition, the QR-code 22 may include information relating to the vertical direction, i.e. tilt angle, in which the mobile device 10 is facing. This tilt angle may be generated by a tilt sensor in the mobile device 10.

The pan and/or tilt directions presented by the mobile device 10 may be assumed to approximate the actual pan and/or tilt directions of the monitoring camera, especially if the display 12 of the mobile device 10 is held substantially in a plane orthogonal to the optical axis of the monitoring camera 14. If this is the case, then the back of the mobile device 10 is arranged facing in the same direction as the monitoring camera 14. To facilitate for the user to hold the display 12 of the mobile device 10 substantially orthogonal to the display the monitoring camera 14 may detect the pattern on the display 12 of the mobile device 10 and check if straight lines in a pattern presented on the display 12 are captured as substantially straight lines or if graphical features having the same size presented on the display 12 really is captured as features of the same size. When the monitoring camera 14 identifies that the display 12 of the mobile device 10 is substantially orthogonal to the optical axis, the monitoring camera 14 may sound a signal or have a light source emit light. The QR-code 22 or any other code used may be used as this type of reference pattern. Further, the QR-code 22 may be frequently changed in order to include the changing directions of mobile device 10 in order to enable the monitoring camera 14 to capture the true direction when the pattern of the QR-code 22 is lined up correctly.

Alternatively the monitoring camera 14 captures the pattern representing the QR-code 22 and then calculates deviations between the optical axis and the directions given in the QR-code 22. The calculation may be based on perspective distortions of the pattern captured by the monitoring camera 14. Examples of such calculations will be presented below.

In another embodiment the QR-code 22 may include an angle of roll. In the description of the present application the angle of roll should be interpreted as the angle through which mobile device 10 must be rotated about an axis orthogonal to the display 12 to bring the bottom or top display edge into a horizontal plane, i.e. the horizontal plane of the real world. For the monitoring camera 14 the angle of roll is defined similar as the angle through which the monitoring camera 14 must be rotated about its optical axis to bring the bottom or top edge of the captured image into a horizontal plane, i.e. the horizontal plane of the real world. The angle of roll of the mobile device 10 may be detected by means of an accelerometer, in some embodiments in combination with a gyro, and be presented in the QR-code 22 on the display 12. This information may then be used by the monitoring camera 14 to calculate its angle of roll.

Moreover, in one embodiment the QR-code 22 includes a cryptographic code authenticating the mobile device 10 as a mobile device 10 authorized to provide position data and possibly other applicable data to the monitoring camera 14 and the monitoring system. The cryptographic code may be implemented using public key encryption, symmetric key encryption, or any other category of cryptography. There are a plurality of well-known implementations in various categories of cryptography.

Initiation of transfer of position data and possibly other data via the QR-code 22 is achieved by having the monitoring camera 14 frequently run a QR-code 22 detection process. In this way the monitoring camera 14 is always prepared to receive coordinates and other data via a QR-code 22. One drawback may be that system resources will be wasted for a long time period when there is no QR-code 22 to identify. Hence, this method would probably be used in a system where QR-codes are used for other purposes as well and wherein the use of QR-codes for these other purposes are performed at such high frequency that the use of the system resources for running QR-code detection processes frequently may be affordable. The frequency of running the processes for detecting QR-codes may vary depending on the application. However a person should not be required to wait more than thirty seconds for detection. When the monitoring camera 14 has detected a QR-code some indicator on the monitoring camera 14, sound or light, should inform the person controlling the mobile device 10 that the QR-code 22 is detected and the processing of it has begun or is finished.

Alternatively, a QR-code detection period is initiated by a signal over the network from a device authorized to control the monitoring network. The system could be arranged to make all or a subset of the monitoring cameras 14 in the monitoring system run the QR-detection process at predetermined intervals during the period. Preferably, the process should be run as often that a user displaying the mobile device to a monitoring camera 14 would not notice any annoying latency before the code is detected. The QR-code detection period, during which the detection process is run frequently, may be set to a specific length, e.g., an hour or thirty minutes, all depending on the extension of the monitoring system. Alternatively, the QR-code detection period may be manually ended by sending a signal from the same device authorized to control the monitoring network or from another device also being authorized.

The information provided to the monitoring camera 14 according to any of the above embodiments may be used by the monitoring camera 14 or by the monitoring system for many purposes. For instance, the positional and directional information may be used to correctly position monitoring cameras 14 on a map or a building plan. The position may be used to draw the monitoring camera 14 at the right position. The pan direction may be used to draw an indication of the area monitored by the monitoring camera 14; the calculation of this area may be refined by considering the focal length used by the camera.

The angle of roll of the monitoring camera 14 and the tilt angle of the monitoring camera 14 may be used to electronically adjust the captured imagery in order to remove slanted horizontal lines and perspective distortions.

Moreover, the position and the pan direction of the monitoring camera 14 may be used in the monitoring system to facilitate handover of tracked objects between monitoring cameras 14 or to identify non monitored areas.

Figure 8:
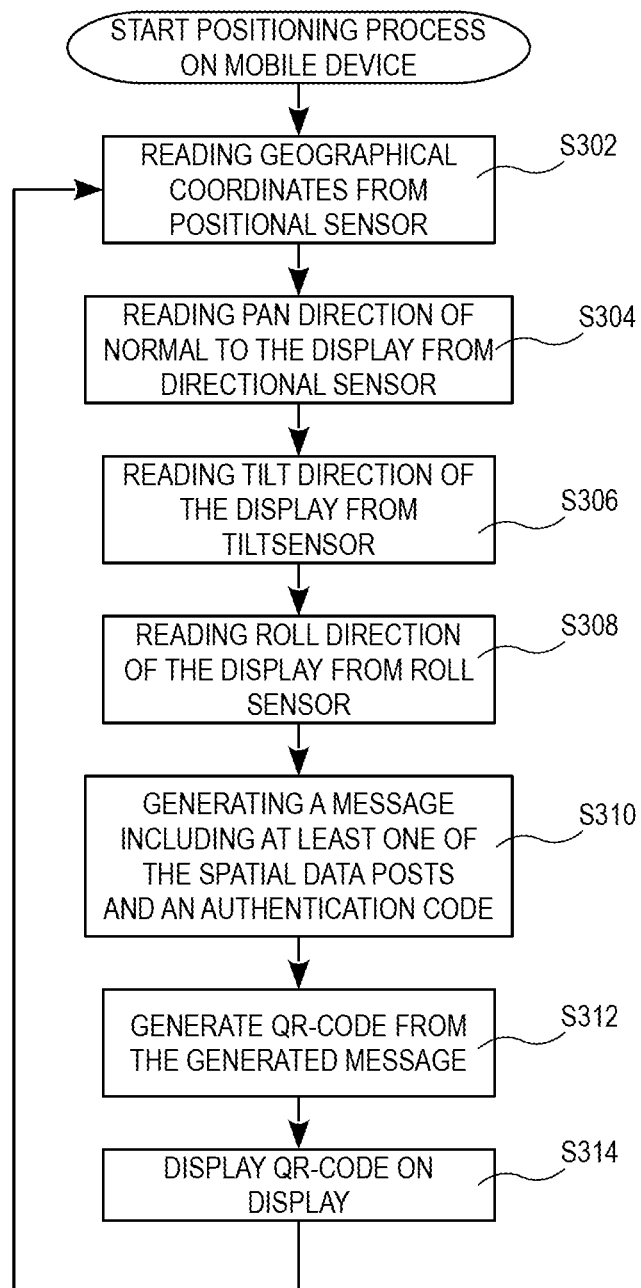
FIG. 8 is a flowchart depicting a process performed by the mobile device according to one embodiment of the invention.

According to one embodiment of the invention the process for determining a position of a monitoring camera 14 includes a person or a vehicle being equipped with a mobile device 10 and the display 12 of the mobile device 10 being directed towards the monitoring camera 14. When the mobile device 10 is in position for having its display 12 captured by the monitoring camera 14, the process described below with reference to FIGS. 8 and 9, respectively presents an example for the determining of the position of the monitoring camera 14. Now referring to FIG. 8, the mobile device 10 is reading geographical coordinates from a position sensor, S302. This reading of geographical coordinates may be performed by the mobile device 10 continuously since the device 10 has been switched on, it may start in response to a user of the device 10 starting an application including the process, and it may be started in connection with the mobile device 10 being used in determining the position of a monitoring camera 14. If available, which is not the case for all embodiments, the direction in which the display 12 or the back of the mobile device 10 is directed is read from a directional sensor, S304, a tilt direction is read from a tilt sensor, S306, and a roll direction is read from a roll sensor, S308. The data used for the tilt direction and the roll direction may be read from the same sensor. Then a message including at least one post of the data read from the sensors is generated, S310, in the mobile device 10. A predetermined authentication code stored in the mobile device 10 or an authentication code keyed in by the user is also included in the message. Further, display specific spatial information, as discussed in connection with FIG. 7, may also be included in the message. When the message has been generated it is encoded into a QR-code 22, S312, which then is displayed on the display 12 of the mobile device 10, S314. This process then returns to S302 in order to read new sensor data in order to display a new QR-code 22 including possibly updated sensor data.

Figure 9:
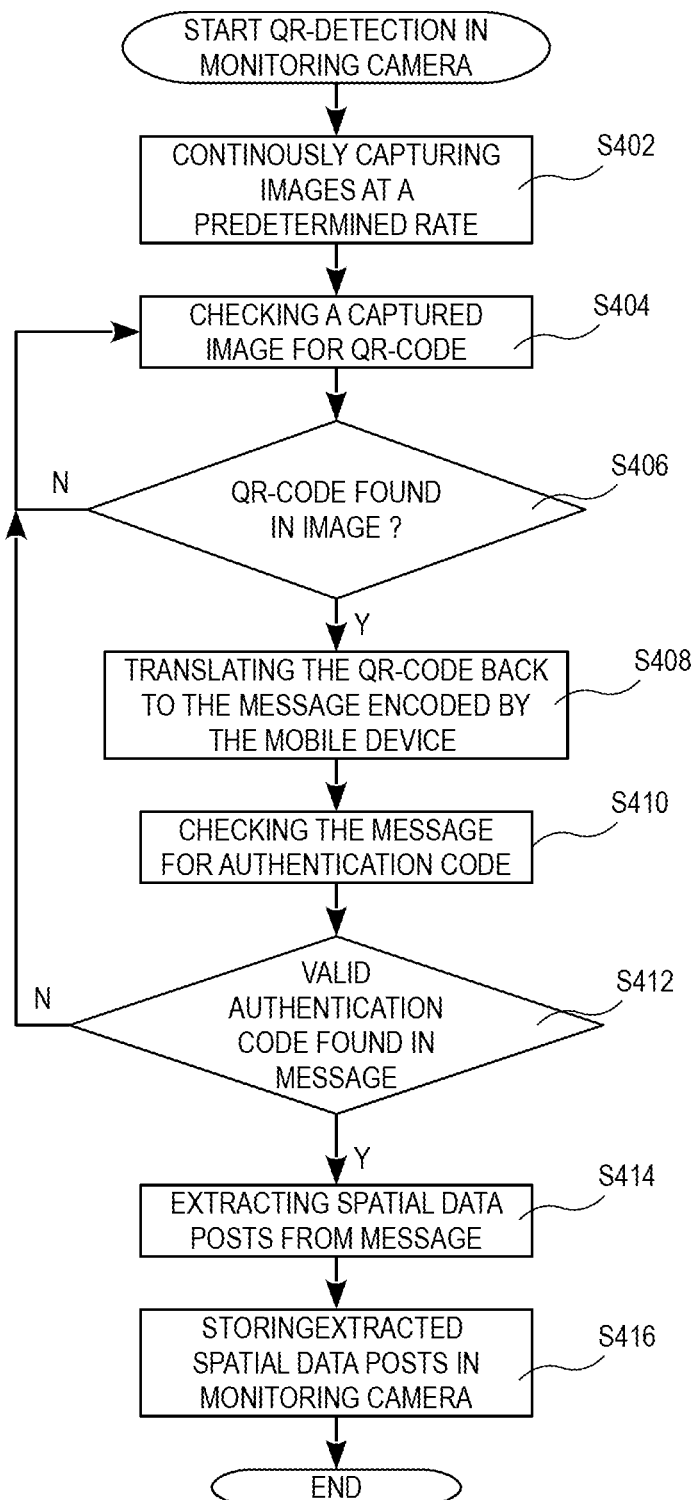
FIG. 9 is a flowchart depicting a process performed by the monitoring camera according to one embodiment of the invention.

Now referring to FIG. 9, the monitoring camera 14 is continuously capturing images at a predetermined rate as part of its operation as a monitoring camera, step 402. The presently captured image is then checked for a QR-code 22, S404. If no QR-code 22 is found, S406, then the process returns to S404, and a later captured image will be checked for a QR-code 22. This is repeated until a QR-code 22 is found in a captured image. Each consecutively captured image is not necessarily checked for a QR-code 22. When a QR-code 22 is found, the QR-code 22 is translated or decoded, S408, to a form that may be processed by the monitoring camera 14. The resulting message is then checked for a valid authentication code, S410. If no valid authentication code is found, S412, then the process returns to S404 where it checks a new image for a QR-code 22. However, if the authentication code is valid, then the message includes authorized sensor data and this sensor data is extracted, S414. The extracted sensor data post is then stored in monitoring camera 14, S416, either to be used as is or for further refinement by combining the sensor data with data resulting from analysis of the captured image of the QR-code 22 in combination with the display specific spatial information included in the QR-code 22. Then the process is ended with the monitoring camera 14 having stored information of its general positioning, e.g., geographic coordinates, horizontal direction, vertical direction, and/or roll direction.

Figure 10:
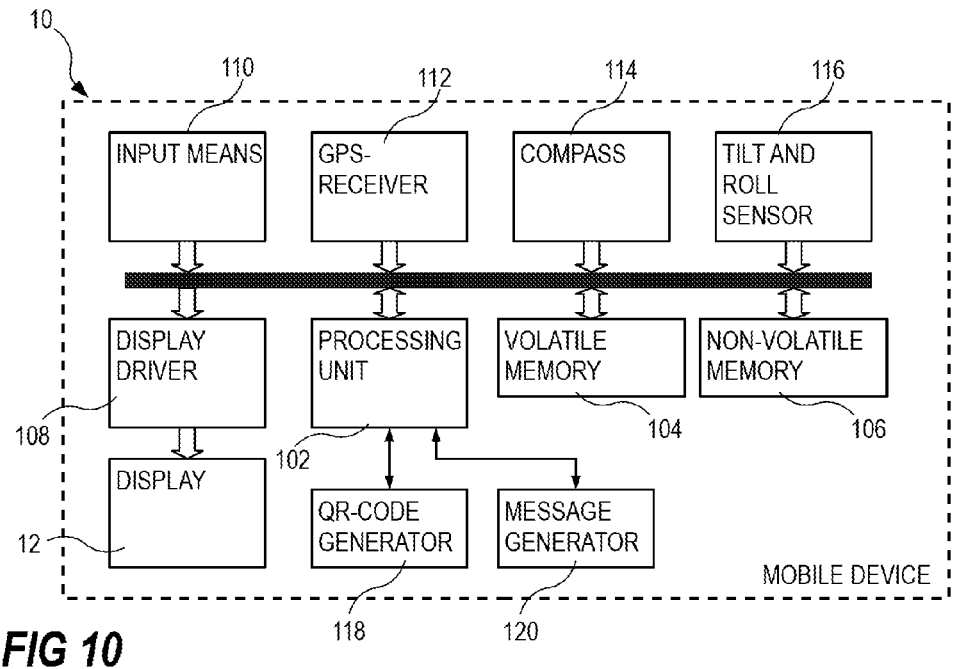
FIG. 10 is a schematic block diagram over a mobile device according to one embodiment of the invention.

One embodiment of the mobile device 10 enabled to perform the inventive process will now be described with reference to FIG. 10. The mobile device includes a color display 12, a processing unit 102 arranged to execute code that is defining functions of the mobile device 10, a volatile memory 104, a non-volatile memory 106, a display driver 108 interfacing the display 12 with the rest of the mobile device 10 in order to present information of the mobile device 10 on the display 12, an input means 110 for manual input of data into the mobile device, a GPS-receiver 112 for acquiring the geographical position of the mobile device by means of accessing some geo positioning service, a compass 114 for providing the direction in which the mobile device 10 is facing, and a tilt and roll sensor 116, which may be one single sensor but could alternatively be two separate sensors. Further, the mobile device 10 according to this embodiment includes a QR-code generator 118 implemented as a program module to be executed by the processing unit 102 and a message generator 120 also implemented as a program module to be executed by the processing unit 102.

The tilt and roll sensor 116 may be a module including a plurality of accelerometers arranged to detect at least these angles or directions. However, the tilt and roll sensor 116 could also be two tilt sensors, e.g., one for front to back tilting, i.e. tilt, and one for side to side tilting, e.g., roll.

Figure 11:
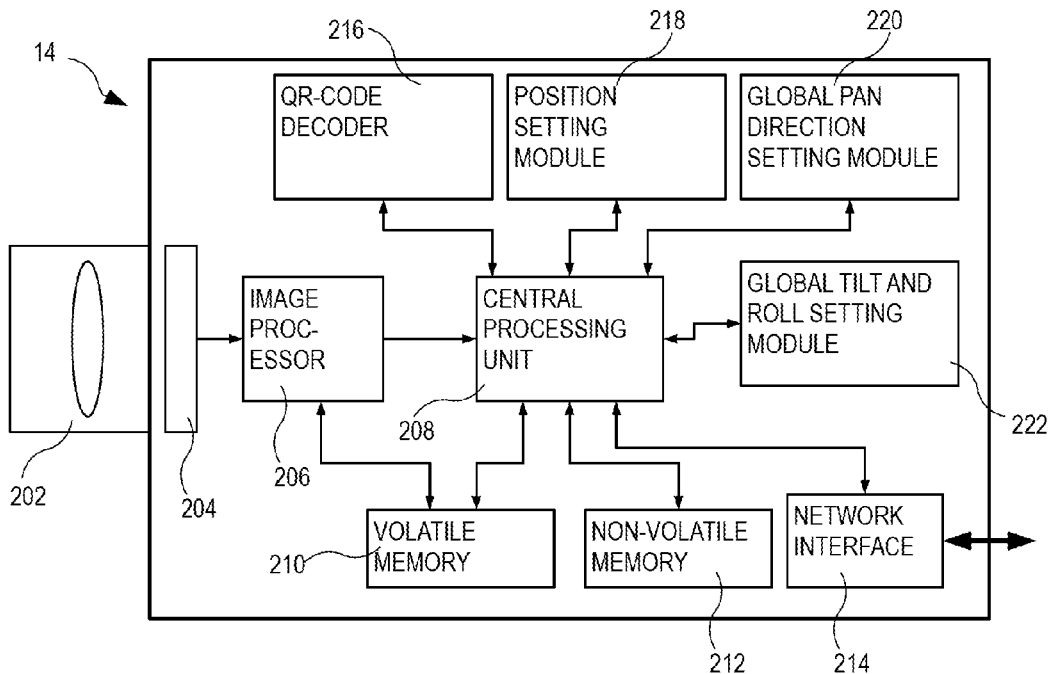
FIG. 11 is a schematic block diagram over a monitoring camera according to one embodiment of the invention.

One embodiment of the monitoring camera 14 enabled to perform the inventive process will now be described with reference to FIG. 11. The monitoring camera 14 may be any ordinary monitoring and/or surveillance camera. The invention is advantageously applied to stationary cameras monitoring or surveying a predetermined area. Hence, the monitoring camera 14 includes features of a normal monitoring camera, e.g., lens 202, image sensor 204, image processor 206, central processing unit 208, volatile memory 210, and non-volatile memory 212. Additionally, the monitoring camera 14 may be a networked monitoring camera and in such case the monitoring camera 14 includes a physical and logical network interface 214. Moreover, the monitoring camera 14 of an embodiment of the invention includes a QR-code decoder 216, a position setting module 218, a global pan direction setting module 220, and a global tilt and roll setting module 222.

The QR-code decoder 216 is arranged to process the graphics representing the QR-code and re-create the message encoded into the QR-code 22 at the mobile device 10, this processing is performed by algorithms known to the person skilled in the art. In applications in which another graphical representation is used the decoder is adapted to these graphical representations instead. For example, if the code is plain text presented on the display of the mobile device, then an Optical Character Recognition (OCR) based decoder is implemented instead, and if the code is a barcode, a barcode decoder is implemented instead.

The position setting module 218 is arranged to store the position in the monitoring camera 14 for later use and/or for sending to a central server. In case the monitoring camera 14 increases the accuracy of the position by considering additional data calculated from the display specific spatial information included in the QR-code 22 and features measured in the captured image of the QR-code 22, these increased accuracy calculations may also be performed in the position module 218.

The global pan direction setting module 220 is arranged to store the compass direction representing the viewing direction of the monitoring camera 14 in the monitoring camera 14 for later use and/or for sending to a central server. In case the monitoring camera 14 increases the accuracy of the pan direction by considering additional data calculated from the display specific spatial information included in the QR-code 22 and features measured in the captured image of the QR-code 22, these increased accuracy calculations may also be performed in the global pan direction setting module 220.

The global tilt and roll setting module 222 is arranged to store the value representing the tilt of the camera and a value representing the roll of the monitoring camera 14 in the monitoring camera 14 for later use and/or for sending to a central server. In case the monitoring camera 14 increases the accuracy of the roll and/or tilt by considering additional data calculated from the display specific spatial information included in the QR-code 22 and features measured in the captured image of the QR-code 22, these increased accuracy calculations may also be performed in the global tilt and roll setting module 222.

The monitoring camera may also include a focal length detector 224, which is arranged to provide data relating to the present focal length of the optical system 202 of the monitoring camera 14. The focal length detector 224 may be implemented as a position signal from a step motor or any other control system controlling a zoom function of the camera or it may be an implementation of an image analyzing method running on a processing unit of the monitoring camera analyzing image data captured. Moreover, in systems where the focal length is not possible to alter, the focal length value may be stored in the monitoring camera for use in calculations.

The detection of if a QR-code is present in the captured image or not may be performed in the image processor 206. Processes described in previous flowcharts and other functions of the mobile device 10 or the monitoring camera 14 may be implemented as program code executed in processing units of the respective device, e.g., the processing unit 102 of the mobile device 10 and the central processing unit 208 of the monitoring camera 14, or these processes or functions may be implemented using logic circuitry.

According to one embodiment the monitoring camera 14 is connected to a network including a central server 20 to which any position and direction data acquired as described above may be sent for further use or processing. Such networked system may include additional monitoring cameras 16 also implementing the invention. The data relating to the position and the direction of the camera may be used to draw a representation of the specific monitoring camera at an accurate position on a plan and direct the camera and an indication of the camera view in the direction it is mounted.

As mentioned above more precise determinations of the position and direction of the camera may be calculated based on the position and direction of the mobile device, using information on the size and shape of the QR code or other pattern displayed on the mobile device. For instance, a homography describing the relationship between 3D coordinates in the real world and 3D coordinates of the camera may be used.

If the geographical coordinates of the mobile device have been determined and are available by capturing the QR code, and information on the size and shape of the QR code are also included in the QR code, the relationship between the position and orientation of the mobile device and the camera may be determined. Hence, the camera position may be determined more accurately by using principles of a per se known camera calibration procedure in order to determine the differences in position and direction between the camera and the mobile device and by using these differences to determine the position and direction of the camera from the position and direction of the mobile device.

Given the information on the size and shape of the QR code, positions of points of the QR code (e.g., the corners or the position indicators) are known in a coordinate system of the QR code itself. By matching points in the image of the QR code with corresponding points in the QR code displayed on the mobile device, coordinate pairs are obtained. The relationship between the coordinates in such a pair may be expressed with the following formula:

$$(x_i, y_i) \rightarrow (X_i, Y_i, Z_i),$$

where $(x_i, y_i)$ denotes the 2D coordinates in the image, and $(X_i, Y_i, Z_i)$ denotes the 3D coordinates in the real world.

Figure 12:
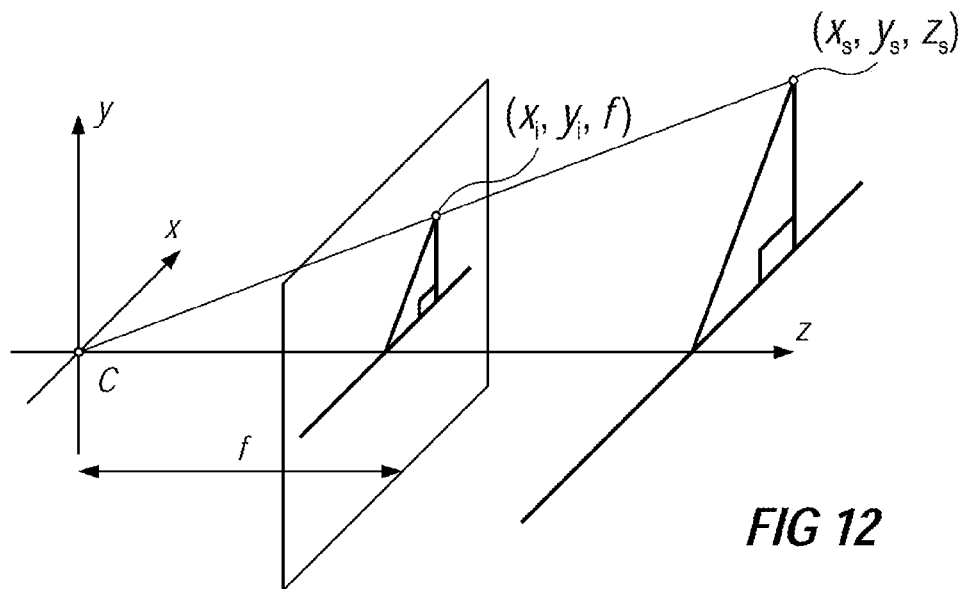
FIG. 12 illustrates a linear transformation between real world points and image points.

Real world points, e.g., points in the displayed QR code, and image points, e.g., points in the QR code as captured by the camera, may be represented by homogeneous vectors. With reference to FIG. 12, central projection thereof is a linear transformation, which may be expressed as follows:

$$x_i = f\frac{x_s}{z_s},$$
$$y_i = f\frac{y_s}{z_s},$$

where f is the focal length of the camera, $(x_i, y_i, f)$ denotes the 3D coordinates of a point in the image, and $(x_s, y_s, z_s)$ denotes the 3D coordinates of the corresponding point in the scene.

$$\begin{bmatrix} u \\ v \\ w \end{bmatrix} = \begin{bmatrix} f & 0 & 0 & 0 \\ 0 & f & 0 & 0 \\ 0 & 0 & 1 & 0 \end{bmatrix} \begin{bmatrix} x_s \\ y_s \\ z_s \\ 1 \end{bmatrix},$$

$$x_i = \frac{u}{w},$$
$$y_i = \frac{v}{w}.$$

The calculations presented here may be performed without prior knowledge of the present focal length, but the calculations will become faster if the focal length is already known. Some examples of methods for acquiring the present focal length will be given later in this description.

A transformation may be made from lengths to pixels using the image center, denoted $(x_0, y_0)$, and scaling factors for scaling from length to pixels, denoted $k_x$ and $k_y$. In the two following equations, $x_{pix}$ and $y_{pix}$ denote coordinates measured in pixels.

$$x_{pix} = k_x x_i + x_0 = fk_x \frac{x_s + z_s x_0}{z_s},$$

$$y_{pix} = k_y y_i + xy_0 = fk_y \frac{y_s + z_s y_0}{z_s}.$$

Similar to the equations above expressed in lengths, the following equations may be used expressed in pixels:

$$\begin{bmatrix} u' \\ v' \\ w' \end{bmatrix} = \begin{bmatrix} \alpha_x & 0 & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix},$$

where $a_x = fk_x,$ $a_y = fk_y,$ which may be regarded as the focal length given in pixels. The pixel coordinates may be expressed as follows:

$$x_{pix} = \frac{u'}{w'},$$

$$y_{pix} = \frac{v'}{w'}.$$

Adding a skew parameter S, a rearrangement may be made as follows:

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 | 0_3]$$

The 3×3 upper triangular matrix K is called the calibration matrix. The parameters in matrix K include intrinsic parameters of the camera and are an important input in the transformation operations.

Figure 13:
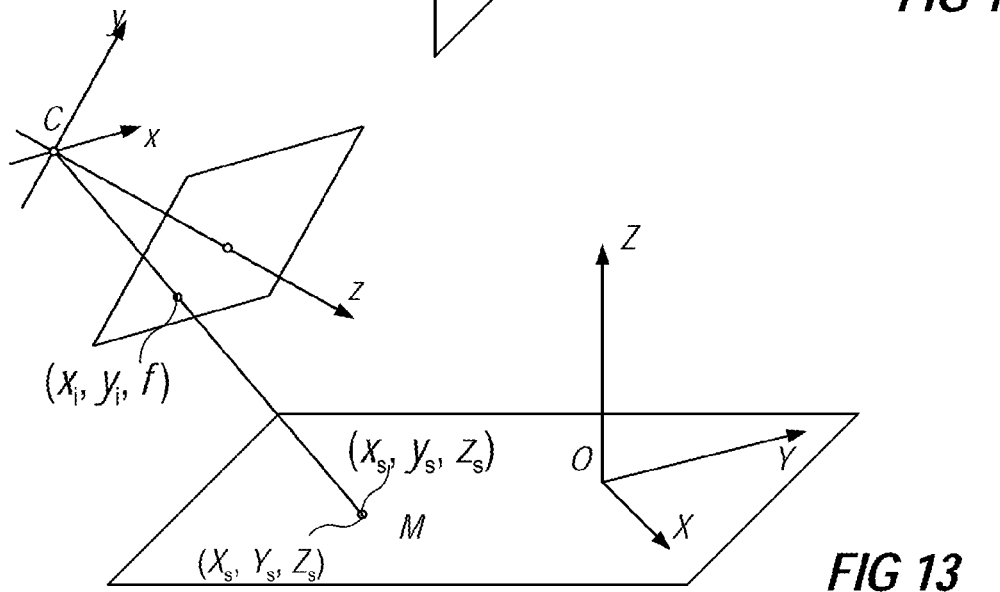
FIGS. 13 and 14 illustrate a relationship between scene points in an image coordinate system and scene points in a real world coordinate system.
Figure 14:
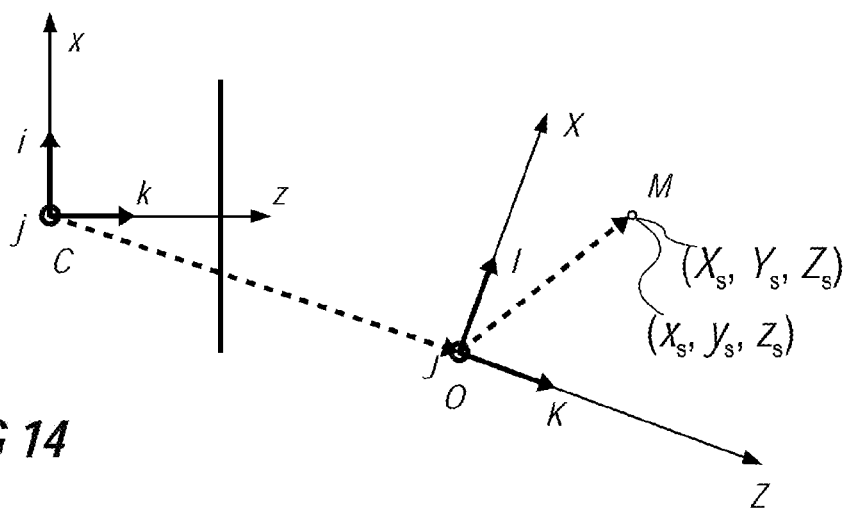

With reference to FIGS. 13 and 14, the relationship between scene points $(x_s, y_s, z_s)$ in the image coordinate system and scene points $(X_s, Y_s, Z_s)$ in the real world coordinate system may be obtained by adding the translation vector CO=T from the starting point of the image coordinate system to the starting point of the real world coordinate system to the vector describing a point M in the real world coordinate system.

$CM = CO + OM,$ $x_s i + y_s j + z_s k = T_x i + T_y j + T_z k + X_s I + Y_s J + Z_s K,$ $x_s = T_x + X_s I \cdot i + Y_s J \cdot i + Z_s K \cdot i,$ $$\begin{bmatrix} x_s \\ y_s \\ z_s \end{bmatrix} = \begin{bmatrix} T_x \\ T_y \\ T_z \end{bmatrix} + \begin{bmatrix} I \cdot i & J \cdot i & K \cdot i \\ I \cdot j & J \cdot j & K \cdot j \\ I \cdot k & J \cdot k & K \cdot k \end{bmatrix} \begin{bmatrix} X_s \\ Y_s \\ Z_s \end{bmatrix}.$$

Using homogeneous coordinates, this may be written as follows:

$$\begin{bmatrix} x_s \\ y_s \\ z_s \\ 1 \end{bmatrix} = \begin{bmatrix} I \cdot i & J \cdot i & K \cdot i & T_x \\ I \cdot j & J \cdot j & K \cdot j & T_y \\ I \cdot k & J \cdot k & K \cdot k & T_z \\ 0 & 0 & 0 & 1 \end{bmatrix} \begin{bmatrix} X_s \\ Y_s \\ Z_s \\ 1 \end{bmatrix},$$

$$\begin{bmatrix} x_s \\ y_s \\ z_s \\ 1 \end{bmatrix} = \begin{bmatrix} R & T \\ 0_3^T & 1 \end{bmatrix} \begin{bmatrix} X_s \\ Y_s \\ Z_s \\ 1 \end{bmatrix}.$$

This may alternatively be expressed as $CM = OM - OC,$ $x_s i + y_s j + z_s k = (X_s - X_C)I + (Y_s - Y_{SC})J + (Z_s - Z_C)K,$ $x_s = (X_s - X_C)I \cdot i + (Y_s - Y_C)J \cdot i + (Z_s - Z_C)K \cdot i,$ $x_{cam} = R(X - \tilde{C}).$ $\tilde{C}$ is the vector OC expressed in world coordinates. Using $-R\tilde{C}$ instead of T, the following equation may be set up:

$$\begin{bmatrix} x_s \\ y_s \\ z_s \\ 1 \end{bmatrix} = \begin{bmatrix} R & -R\tilde{C} \\ 0_3^T & 1 \end{bmatrix} \begin{bmatrix} X_s \\ Y_s \\ Z_s \\ 1 \end{bmatrix}.$$

The camera projection matrix and the coordinate transformation matrix may be combined into one matrix P.

$$\begin{bmatrix} u' \\ v' \\ w' \end{bmatrix} = K[I_3 | 0_3] \begin{bmatrix} x_s \\ y_s \\ z_s \\ 1 \end{bmatrix} \text{ and } \begin{bmatrix} x_s \\ y_s \\ z_s \\ 1 \end{bmatrix} = \begin{bmatrix} R & -R\tilde{C} \\ 0_3^T & 1 \end{bmatrix} \begin{bmatrix} X_s \\ Y_s \\ Z_s \\ 1 \end{bmatrix}$$

give $$\begin{bmatrix} u' \\ v' \\ w' \end{bmatrix} = K[I_3 | 0_3] \begin{bmatrix} R & -R\tilde{C} \\ 0_3^T & 1 \end{bmatrix} \begin{bmatrix} X_s \\ Y_s \\ Z_s \\ 1 \end{bmatrix},$$

which may be expressed as $$\begin{bmatrix} u' \\ v' \\ w' \end{bmatrix} = P \begin{bmatrix} X_s \\ Y_s \\ Z_s \\ 1 \end{bmatrix},$$

or $$x = PX$$

This may he simplified as follows:

$$x = K[I_3 \mid 0_3]\begin{bmatrix} R & -R\tilde{C} \\ 0_3^T & 1 \end{bmatrix} X,$$

$$[I_3 \mid 0_3]\begin{bmatrix} R & -R\tilde{C} \\ 0_3^T & 1 \end{bmatrix} = [R \quad -R\tilde{C}] = R[I_3 \mid -\tilde{C}],$$

$$x = KR[I_3 \mid -\tilde{C}]X,$$

$$P = KR[I_3 \mid -\tilde{C}].$$

This matrix P has eleven degrees of freedom, whereof five are from the triangular calibration matrix K, three are from R, and three are from $\tilde{C}$. It may be noted that P is a 3×4 matrix, and that the left 3×3 submatrix KR is non-singular. P may be estimated using points in the scene and corresponding points in the image. If the calibration matrix K is already known, this estimation is simplified significantly. However, using a sufficient number of pairs of points, P may be estimated even if the calibration matrix is not yet known.

In order to determine the camera translation, the homogeneous coordinates of C in the scene should be found. C is the null vector of the matrix P. Thus:

$$PC = 0,$$

$$P = KR[I_3 \mid -\tilde{C}],$$

$$\begin{bmatrix} 1 & 0 & 0 & X_C \\ 0 & 1 & 0 & Y_C \\ 0 & 0 & 1 & Z_C \end{bmatrix} \begin{bmatrix} X_C \\ Y_C \\ Z_C \\ 1 \end{bmatrix} = \begin{bmatrix} 0 \\ 0 \\ 0 \\ 0 \end{bmatrix}.$$

The null vector C of P may be found using singular value decomposition.

Further, the camera orientation and the intrinsic parameters may be found. Here, it may be noted that the left 3×3 submatrix M of P is of the form M=KR. K is an upper triangular matrix, and R is an orthogonal matrix. A non-singular matrix M may be decomposed into a product of K and R using RQ factorization. As already noted, if the calibration matrix K is already known, i.e. the camera is calibrated, the calculations are simplified.

The matrix P may be computed by taking 3D points $X_i$ in the world coordinates system and corresponding images $x_i$ of $X_i$ in the image, and writing $x_i = PX_i$ for all i. This matrix P may then be used for calculating the position and orientation of the camera based on the position of the mobile device as stated in the QR code displayed on the mobile device adjusted by parameters calculated from the P matrix. The position of the camera in relation to the QR-code in real world coordinates, i.e. coordinates relating to the three dimensional world outside the image plane captured by the camera, is provided in matrix C and the orientation of the camera in relation to the three axes of the real world coordinate system, i.e. the rotation of the camera in view of these axes, is provided in matrix R.

Such calculations may be performed using software code available, e.g., in OpenCV or Camera Calibration Toolbox for Matlab.

Such calculations may be performed using software code available, e.g., in OpenCV or Camera Calibration Toolbox for Matlab. Such calculations may be performed using software code available, e.g., in OpenCV or Camera Calibration Toolbox for Matlab.

Figure 15:
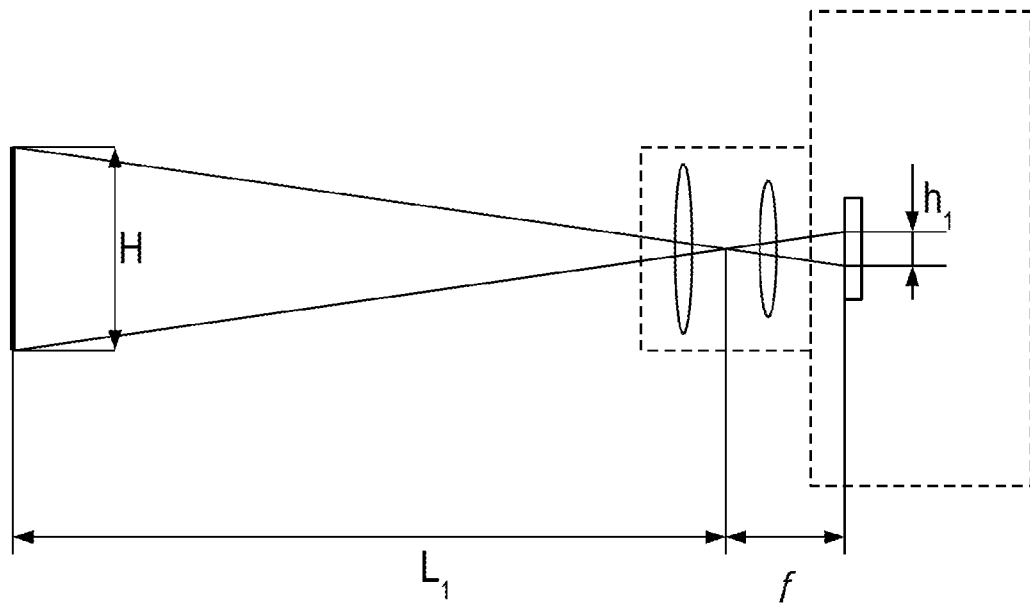
FIG. 15 illustrates features used in an example method for calculating the focal length of a lens in use.

The focal length of the system, i.e. the lens, may be extracted from the P matrix above. However, in order to speed up calculations and make the solving of the matrixes above require less processing power the focal length may be provided beforehand. In these cases the focal length may be preset, e.g., in a system with fixed focal length lens, or it may be typed in. Alternatively, the monitoring camera may use an automatic focal length determining method. There are plenty of methods designed for identifying the focal length of a lens in use. One example of such method utilizes the approximation presented in the equation below, referring to FIG. 15:

$$h_1 = f \frac{H}{L_1}$$

Figure 16:
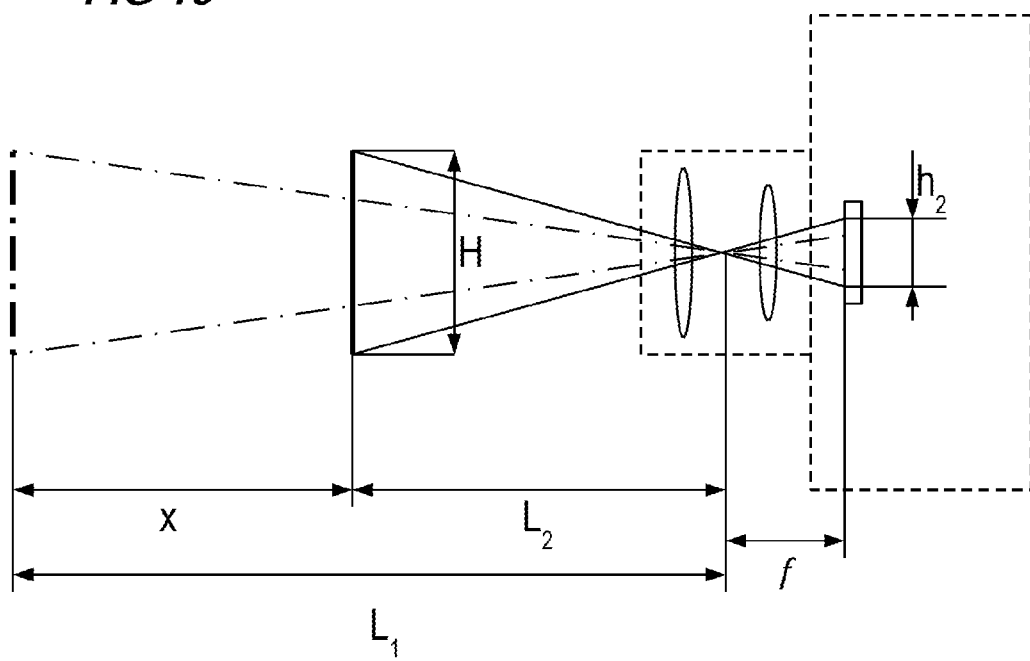
FIG. 16 illustrates further features in the example method for calculating the focal length.

In the equation, $h_1$ is the captured height of an object having the height H, e.g., the distance LQ of the graphical code in FIG. 7 or the height of the entire mobile device. $L_1$ is the distance from the camera to the object and f is the focal length of the lens in use. The focal length f may be calculated if the height $h_1$ of the object as captured on the image sensor is determined by the camera at a first distance $L_1$ from the camera and then the height $h_2$ of the object as captured on the image sensor is determined by the camera at a second distance L2, see FIG. 16.

$$h_2 = f \frac{H}{L_2}$$

In order to achieve this, the distance moved between the two captures of the images of the object is measured or estimated, referred to as d below.

$$d = L_1 - L_2$$

The real height of the object is the same independent of positions, which results in the following:

$$f = \frac{h_1}{H} L_1 = \frac{h_2}{H} L_2$$

and $$h_1 L_1 = h_2 L_2 = h_2 (L_1 - d)$$

Then $$L_1 = \frac{h_2 d}{(h_2 - h_1)}$$

Which results in the equation of the focal length below:

$$f = \frac{h_1 h_2 d}{H(h_2 - h_1)}$$

Hence, by capturing two images of the graphical code at a predetermined distance between the graphical code at the two different capturing moments, the camera is able to calculate the focal length.

In other embodiments the position of the monitoring camera 14 may be determined by holding the mobile device in contact with the monitoring camera 14. The mobile device 10 may be held onto the front of the lens in order to have the mobile device 10 be positioned substantially at the same geographic position as the monitoring camera 14 and if the back or front of the mobile device 10 is held flush with the outer rim of the lens of the monitoring camera 14 then the direction of the mobile device 10 and the direction of the mobile device will substantially correspond. Moreover, in order to make the angle of roll of the monitoring camera 14 substantially correspond to the angle of roll of the mobile device 10 the user holding the mobile device 10 may change the angle of roll of the mobile device 10 until a substantially rectilinear edge of the mobile phone visually aligns with a substantially rectilinear feature of the monitoring camera 14, e.g., the user may aim to hold the upper edge of the mobile device parallel to the upper edge or surface of the monitoring camera 14. When the mobile device 10 is held in place like described above the user triggers a process for at least temporarily storing any one of or any combination of the geographic position, the direction, and the angle of roll detected by the mobile device 10. This storing process may be triggered by the user pushing a button on the mobile device 10 or any other possible triggering action. The mobile device 10 generates a graphical code 22 for display on the display 12 of the mobile device, as described above. The graphical code 22 includes at least some of the stored data, e.g., geographic position, direction, and/or angle of roll. As described earlier in this specification the graphical code may be a QR-code. The mobile device 10 is moved to a distance from the lens of the monitoring camera 14 where the display of the mobile device 10 may be captured by the monitoring camera 14 itself. Then the monitoring camera may decode the graphical code and determine its geographical position, its viewing direction, and/or its angle of roll, depending on which features are encoded into the graphical code.

The angle of roll may be dynamic in this setup, i.e. it will not be locked to the value captured when the mobile device 10 is triggered for storing of the rest of the positional data. Then the monitoring camera 14 may operate on the angle of roll data as described previously where the angle of roll data and thus the QR-code is frequently updated.

In other embodiments the processes above may be used in order to help a person installing or servicing a monitoring camera 14 to get the horizon level in the captured image. The mobile device 10 is held in front of the camera as described in any embodiment above. The graphical code presented on the display 12 of the mobile device is frequently updated with at least the information relating to angle of roll of the mobile device 10. The camera calculates the angle of roll of itself based on the captured image of the graphical code and decoded information carried by the graphical code, i.e. the monitoring camera calculates its angle of roll based on the image captured and the information provided from the mobile device 10. The resulting angle of roll of the monitoring camera is then evaluated, e.g., by the monitoring camera itself or by a computational device in a network connected to the camera, and a sound or a light generated by the monitoring camera 14 is controlled in order to indicate whether the angle of roll is acceptable or not. The sound or light may either be generated to indicate that the angle of roll is acceptable or that it is not acceptable.

In order to facilitate understanding of such an implementation an example will be presented. The mobile device is held in front of the monitoring camera 14 showing the graphical code so that it may be captured by the camera. If the camera is angled around the optical axis of the monitoring camera and in relation to the horizon a light emitting diode (LED) is activated to emit light. The person installing or servicing the camera may then turn the camera around the optical axis until the LED stops emitting light, indicating that the angle of roll is acceptable.

If high accuracy is desired when determining the position of the camera, the QR-code or other pattern displayed on the mobile device needs to be updated when the mobile device is moved around in front of the camera. However, this introduces a risk of capturing incomplete or broken QR-codes, since the frame rate at which the camera captures images is not necessarily synchronized with the update frequency of the display of the mobile device. Images captured at the time of updating the display of the mobile device may contain a mix of an old QR-code and a new QR-code. In order to reduce the problem of capturing incomplete QR-codes, the update frequency of the display of the mobile device may be reduced, such that the pattern on the display is updated fewer times per second than the frame rate of the camera. For instance, the display may be updated at intervals corresponding to two or three frames captured by the camera. Still, this would add latency that would reduce the accuracy of the determination of the camera position, and it would also imply processing unnecessary duplicates of QR-code images.

Instead, the risk of capturing incomplete QR-codes may be reduced by taking advantage of the different color channels of the camera and the display, as discussed above. When the QR-code is to be updated, it is first updated only on the green color channel, while the red and blue color channels still show the previous QR-code. Next time the QR-code is to be updated, the red and blue color channels are updated, while the green color channel displays the same QR-code as before. Thus, the display will be displaying two QR-codes simultaneously with one or two color channels displaying the QR-code corresponding to the latest determined position of the mobile device, and the other one or two color channels displaying the QR-code corresponding to the previously determined position of the mobile device. It would also be possible to perform the updating as a three-step process, first updating one of the color channels (e.g., red), then another color channel (e.g., green) and finally the last color channel (e.g., blue). Translation of the QR-code into a geographical position is done in the camera one, or when applicable two, color channel at a time. Should one the color channels of the captured image contain an incomplete or mixed QR-code, the other color channel or color channels may still be used for determining the position of the camera. Advantageously, the QR-code need only be located once in each image captured by the camera, and then decoded or translated into a position twice (or three times depending on the number of color channels into which the updating is split), i.e. once per applicable color channel.

The skilled person will realize that such an update approach is not limited to QR-codes, but may be used with all sorts of patterns as discussed earlier. This approach is also not limited to an RGB (red, green, blue) color space, but may be used with any color space used by the combination of mobile device display and camera at hand.

In an alternative embodiment the visual transmission using different colored graphical codes for the transmission of information, as described in this specification, may also be used in an audio calibration system and process, as indicated by the loudspeaker in FIG. 1. The arrangement of a motion video camera 14 and a loudspeaker 16 connected to a processing device for controlling the generation of audio by means of the loudspeaker 16 may be used in order to calibrate the settings of the system generating an electric audio signal to the loudspeaker 16.

A microphone of the display device 10, or connected to the display device 10, records the audio at the position of the microphone, analyses the registered audio, and continuously presents information relating to the recorded audio on the display 12 of the display device 10. The motion video camera 14 captures motion video of the display device 12 and the information carrying pattern is decoded as described previously. The information transmitted via the information carrying pattern may then be used in setting parameters of the loudspeaker. Information relating to the recorded audio that may be transmitted via the information carrying pattern may be a mean value of detected sound level over a predetermined time period, which mean value may be frequently updated, data representing the recorded sound wave over a time period, etc. The audio system may use the information for setting a suitable level of amplifying for the audio signal. An example of such an audio system is disclosed in EP-3 018 917.

What is claimed is:

1. A method for visual transmission of repeatedly changing information, the method comprising:
    repeatedly performing the following set of actions:
    receiving a first set of information to transmit, wherein the first set of information is an update of a previously received set of information,
    generating an information carrying first pattern representing the first set of information,
    displaying the information carrying first pattern in a first color,
    receiving a second set of information to transmit, wherein the second set of information is an update of the first set of information,
    generating an information carrying second pattern representing the second set of information,
    displaying the information carrying second pattern in a second color, wherein the second color differs from the first color, and
    wherein one of the information carrying patterns is statically displayed when another one of the information carrying patterns is updated.

2. The method according to claim 1, wherein the information carrying pattern is forming a one dimensional graphical code.

3. The method according to claim 2, wherein the one dimensional graphical code is a bar code.

4. The method according to claim 1, wherein the information carrying pattern is forming a two dimensional graphical code.

5. The method according to claim 4, wherein the two dimensional graphical code is a QR-code.

6. The method according to claim 1, wherein the information carrying first and second patterns are interweaved in a same display area.

7. The method according to claim 1, further including in each repetition:
    receiving a third set of information to transmit, wherein the third set of information is an update of the second set of information,
    generating an information carrying third pattern representing the third set of information, and
    displaying the information carrying third pattern in a third color, wherein the third color differs from the first color and from the second color.

8. A method for capturing and decoding visually transmitted and repeatedly updated information, the method comprising:
    repeatedly performing the following set of actions:
    capturing, by a digital image sensor, an image of a display including at least two information carrying patterns of different color,
    extracting from the captured image the information carrying pattern of a first color,
    decoding information from the extracted information carrying pattern of the first color,
    extracting from the captured image the information carrying pattern of a second color, and
    decoding information from the extracted information carrying pattern of the second color,
    wherein the decoding of the extracted pattern of the second color is performed in response to the decoding of the extracted pattern of the first color returning corrupt data.

9. The method according to claim 8, wherein the extracting from the captured image of the pattern of a second color is performed in response to the decoding of the extracted pattern of the first color returning corrupt data.

10. The method according to claim 8, further including extracting from the captured image the pattern of a third color and decoding the extracted pattern of the third color.

11. The method according to claim 8, further comprising:
    detecting that the information in one of the extracted pattern of the first color and the extracted pattern of the second color is corrupt; and
    in response to detecting:
        selecting the information from the extracted pattern of the first color as valid information when the extracted pattern of the second color is detected as corrupt, and
        selecting the information from the extracted pattern of the second color as valid information when the extracted pattern of the first color is detected as corrupt.

12. A system including an image capturing device and a display device,
    wherein the display device is arranged to display repeatedly updated information by repeatedly performing a first set of actions, the first set of actions including:
    receiving a first set of information to transmit, wherein the first set of information is an update of a previously received set of information,
    generating an information carrying first pattern representing the first set of information,
    displaying the information carrying first pattern in a first color,
    receiving a second set of information to transmit, wherein the second set of information is an update of the first set of information,
    generating an information carrying second pattern representing the second set of information,
    displaying the information carrying second pattern in a second color, wherein the second color differs from the first color, and
    wherein one of the information carrying patterns is statically displayed when another one of the information carrying patterns is updated; and
    wherein the image capturing device is arranged to capture and decode the displayed and repeatedly updated information by repeatedly performing a second set of actions, the second-set of actions including:
  capturing, by a digital image sensor, an image of a display including at least two information carrying patterns of different color,
  extracting from the captured image the information carrying pattern of a first color,
  decoding information from the extracted information carrying pattern of the first color,
  extracting from the captured image the information carrying pattern of a second color, and
  decoding information from the extracted information carrying pattern of the second color.

13. The system according to claim 12, wherein the display device is a handheld mobile display device and the image capturing device is a motion video camera.

14. The system according to claim 13, wherein the repeatedly updated information includes position coordinates of the handheld mobile display.

15. Method for capturing and decoding visually transmitted and repeatedly updated information, the method comprising:
  repeatedly performing a set of actions, wherein the set of actions includes:
    capturing, by means of a digital image sensor, an image of a display including at least two information carrying patterns of different color;
    extracting from the captured image the information carrying pattern of a first color,
    decoding information from the extracted information carrying pattern of the first color;
    checking if the decoded information from the extracted information carrying pattern of the first color is corrupt or not;
    in case the decoded information from the extracted information carrying pattern of the first color is not corrupt:
      managing the decoded information from the extracted information carrying pattern of the first color in accordance with an application presently being a recipient of the information; and
    in case the decoded information from the extracted information carrying pattern of the first color is corrupt:
      extracting from the captured image the information carrying pattern of a second color,
      decoding information from the extracted information carrying pattern of the second color, and
      managing the decoded information from the extracted information carrying pattern of the second color in accordance with the application presently being the recipient of the information.

16. Method according to claim 15, further including extracting from the captured image the pattern of a third color and decoding the extracted pattern of the third color.

* * * * *